United States Patent [19]
Eppich

[11] Patent Number: 6,113,376
[45] Date of Patent: Sep. 5, 2000

[54] EJECTION UNIT FOR AN INJECTION MOLDING MACHINE

[75] Inventor: Stefan Eppich, Arbing, Austria

[73] Assignee: Engel Maschinenbau Gesellschaft m.b.H., Schwertberg, Austria

[21] Appl. No.: 09/176,732

[22] Filed: Oct. 21, 1998

[30] Foreign Application Priority Data

Oct. 24, 1997 [AT] Austria .................................. 1805/97

[51] Int. Cl.$^7$ .................................................. B29C 45/40
[52] U.S. Cl. ........................................... 425/190; 425/556
[58] Field of Search ..................................... 425/556, 190

[56] References Cited

U.S. PATENT DOCUMENTS 4,865,536 9/1989 Inaba et al. ............................ 425/556
5,439,371 8/1995 Sawaya ................................. 425/556

FOREIGN PATENT DOCUMENTS 000287 6/1995 Austria .
4228140 8/1992 Germany .

*Primary Examiner*—Tim Heitbrink
*Attorney, Agent, or Firm*—Notaro & Michalos P.C.

[57] ABSTRACT

An ejection unit for an injection molding machine has a movable and a stationary mold mounting plate. Anchored to the movable mold mounting plate is the carrier plate on which an electric motor is supported by a bracket. An ejector plate is displaceable by the electric motor by way of a drive output shaft. A drive wheel for a further subsidiary function of the injection molding machine, for example mold height adjustment, is coupleable to the drive output shaft.

11 Claims, 8 Drawing Sheets

EJECTION UNIT FOR AN INJECTION MOLDING MACHINE

FIELD AND BACKGROUND OF THE INVENTION

The invention relates to an ejection unit for an injection molding machine comprising a movable and a stationary mold mounting plate and a carrier plate which can be anchored to one of the mold mounting plates, and on which is mounted an electric motor with which an ejector plate can be displaced by way of a drive output shaft.

DE 42 28 140 A1 discloses an ejection unit for injection molding machines, in which an electric motor is mounted on the movable mold mounting plate. That electric motor is in engagement by way of a spur gear transmission with a plurality of rotatable screwthreaded spindles projecting from the mold mounting plate. The ejector plate is displaceable by way of female screwthreads on the screwthreaded spindles.

The object of the present invention is to improve an ejection unit of the kind set forth in the opening part of this specification, such that better use is made of the electric motor.

In accordance with the invention that is achieved in that a drive wheel for a further subsidiary function of the injection molding machine, for example mold height adjustment, can be coupled to the drive output shaft.

Instead of the mold height adjustment, the electric motor of the ejection unit according to the invention could also be used to effect actuation of the core draw means or to implement another subsidiary function of the injection molding machine.

The drive wheels are advantageously in the form of a gear wheel or a belt pulley.

In accordance with the invention it is provided both that the drive wheel for the ejector plate is permanently non-rotatably coupled to the drive output shaft while the second drive wheel is selectively coupleable to the drive output shaft and also that the two drive wheels are alternately coupleable to the drive output shaft.

Coupling of the drive wheels is preferably effected electromagnetically or pneumatically.

An embodiment of the invention provides that the drive output shaft projects into an axially displaceable coupling tube which has an outer gear ring and is coupled to the drive output shaft by way of a spline-key connection or the like, that the two drive wheels each have an inner gear ring and that the outer gear ring of the coupling tube can be brought alternately into engagement with the gear ring of the one drive wheel or the other by axial displacement of the tube.

A further embodiment of the invention provides that the coupling tube is axially displaceable by means of a bracket which bears in face contact and in frictional engagement against the drive wheel for the subsidiary function when the gear ring of the coupling tube is in engagement with the drive wheel for the ejector plate.

Embodiments of the invention are described hereinafter with reference to the Figures of the accompanying drawings.

DESCRIPTION OF THE PREFERRED EMBODIMENTS

Figure 1:
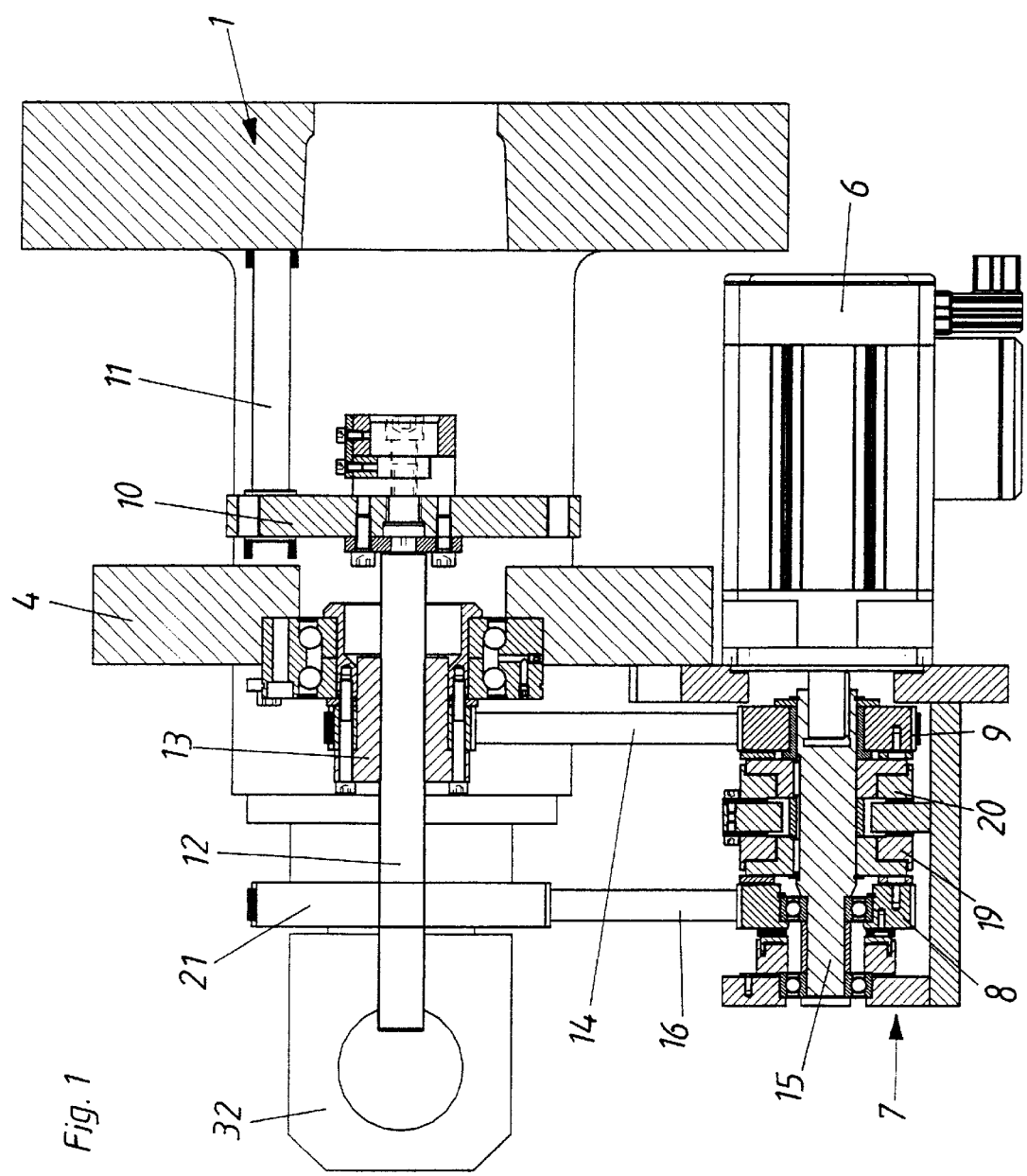
FIG. 1 shows a view in section taken along line A—A in FIG. 2.
Figure 2:
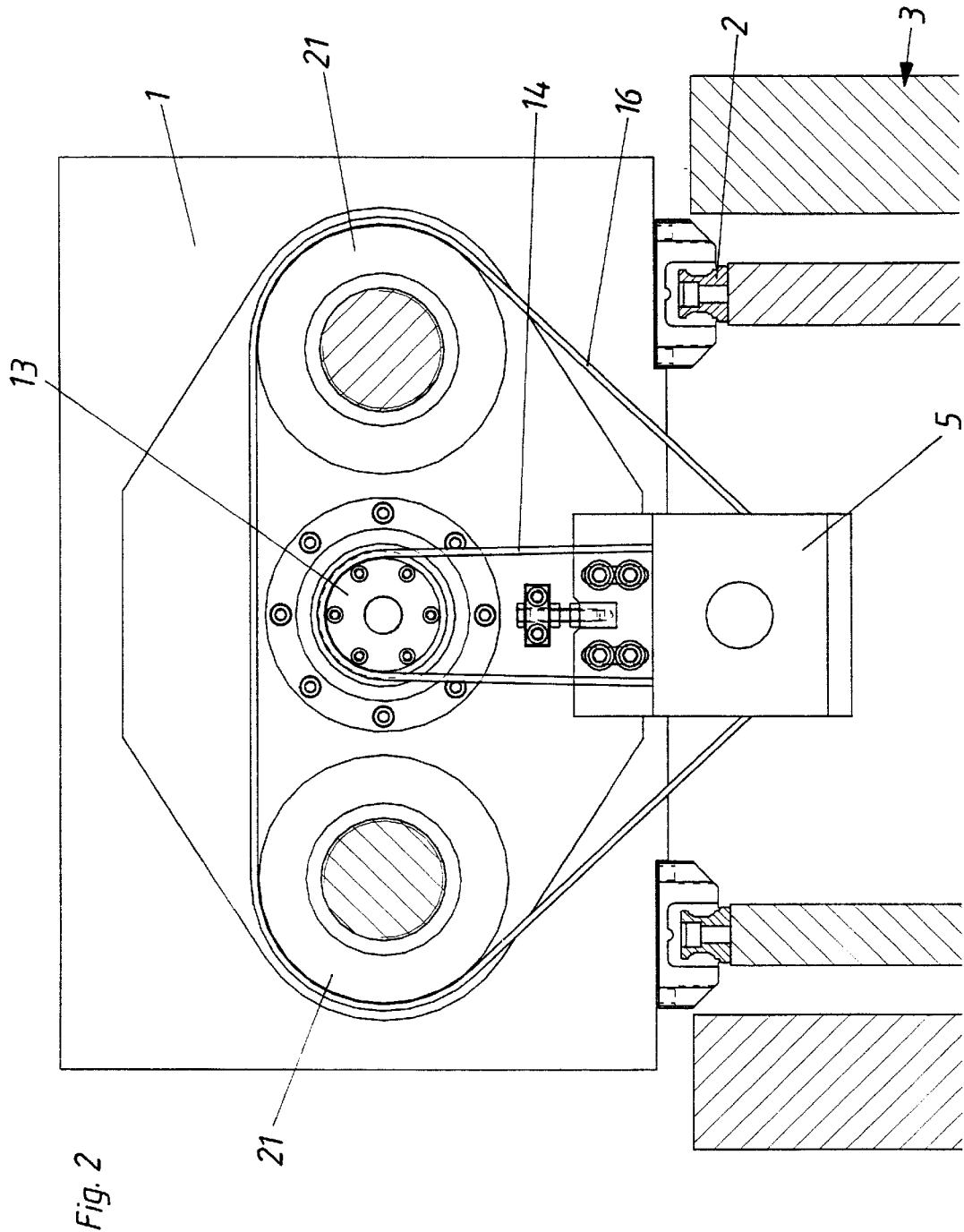
FIG. 2 shows an end view of the movable mold mounting plate and parts of the drive for the ejector plate.
Figure 3:
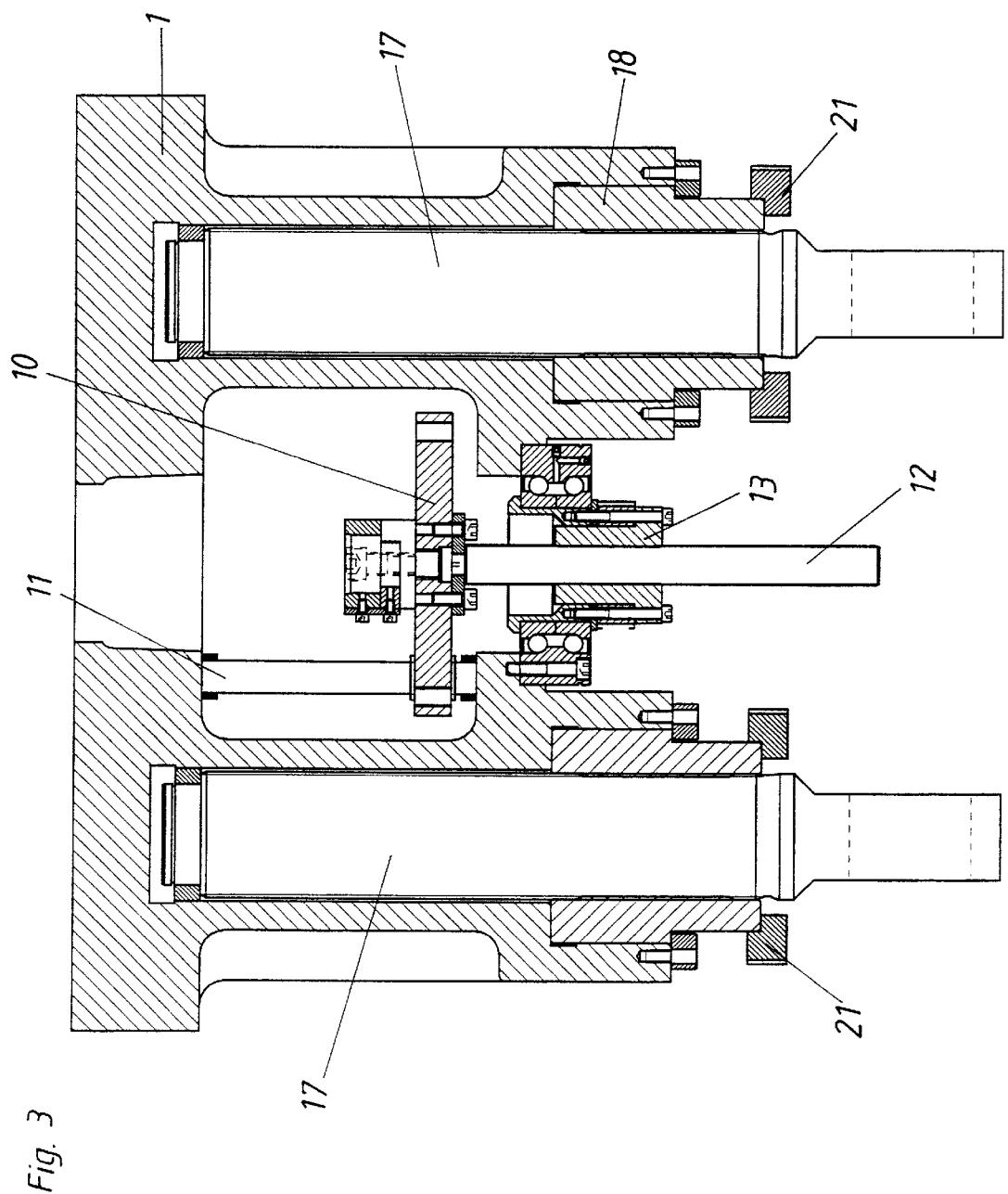
FIG. 3 shows a view in section taken along line C—C in FIG. 2.

Referring to the Figures of the drawings, only the movable mold mounting plate 1 and the ejection unit according to the invention with the ancillary arrangements are shown therein. The actual injection molding machine is designed in accordance with the state of the art. For example the ejection unit according to the invention could be used in an injection molding machine, as is described in EU-A1.

A carrier plate 4 is anchored to the movable mold mounting plate 1 which is movable on rails 2 of the machine frame 3. The drive unit of the ejection unit is mounted by means of a bracket 5 to the carrier plate 4. The bracket 5 carries the electric motor 6 and a transmission 7 in which the drive wheels 8, 9 for the ejector plate 10 and a further device of the injection molding machine are accommodated. The electric motor 6 is preferably a servo motor.

The ejection unit includes an ejector plate 10 which is guided on bar members 11. The ejector plate 10 is moved by way of a spindle 12. The spindle 12 is immovably mounted in the ejector plate 10. Carried on the spindle 12 is a nut 13 which is rotatably but axially immovably mounted to the carrier plate 4. The nut 13 is driven by way of a belt 14, preferably a toothed belt, by the drive wheel 9.

The drive wheels 8, 9 are mounted in bearings 28 on bearing blocks 29 and are coupled or coupleable to a drive output shaft 15 of the electric motor 6.

Two adjusting nuts 18 for mold height adjustment are rotated by means of the drive wheel 8 by way of a belt 16 and two belt wheels 21. The adjusting nuts 18 are each mounted on a respective one of adjusting spindles 17 which in turn are mounted in the movable mold mounting plate 1.

Figure 4:
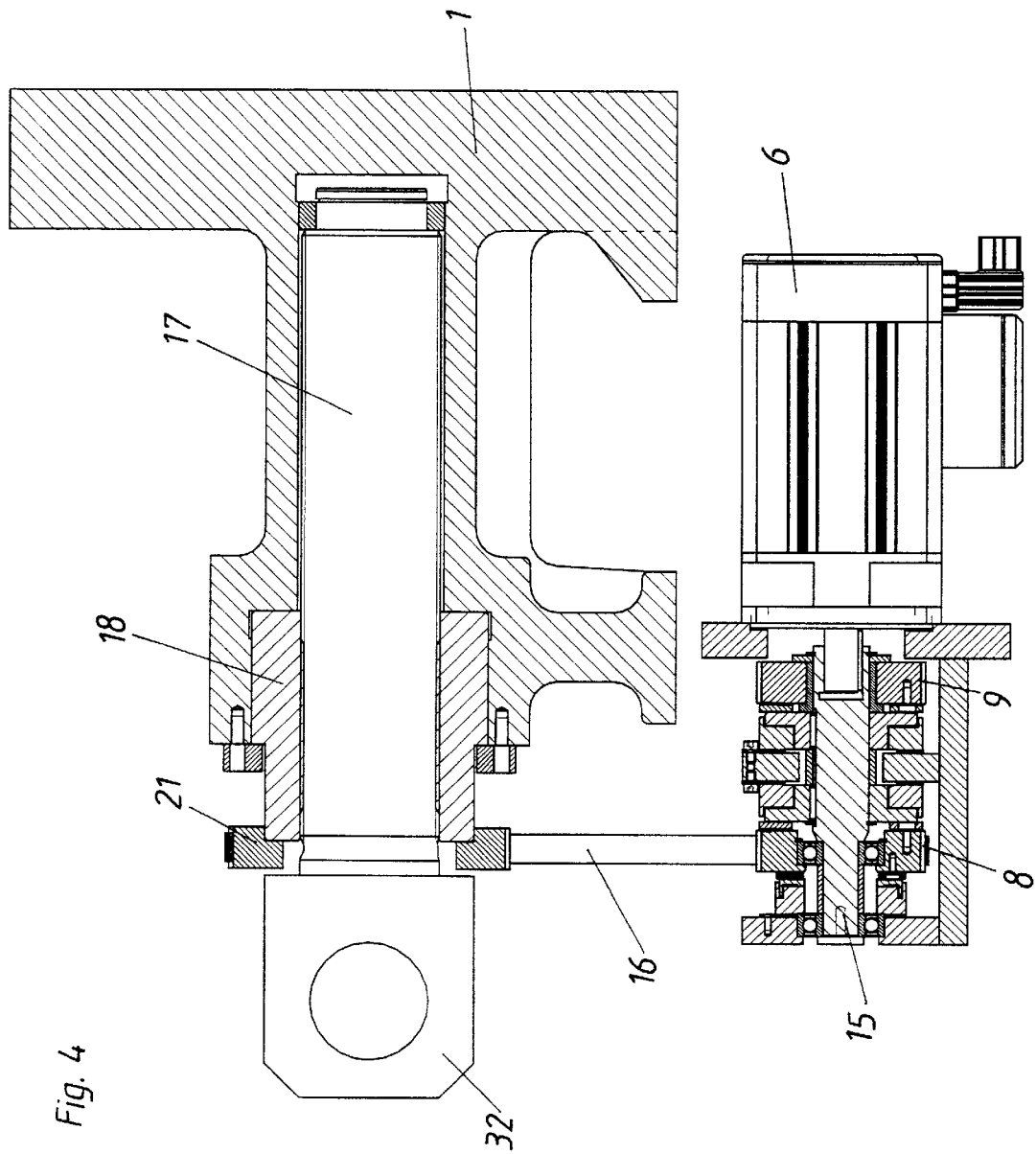
FIG. 4 shows a view in section taken along line B—B in FIG. 2, and FIGS. 5 through 8 each show longitudinal sections through the drive wheels and the coupling device for the drive wheels.
Figure 5:
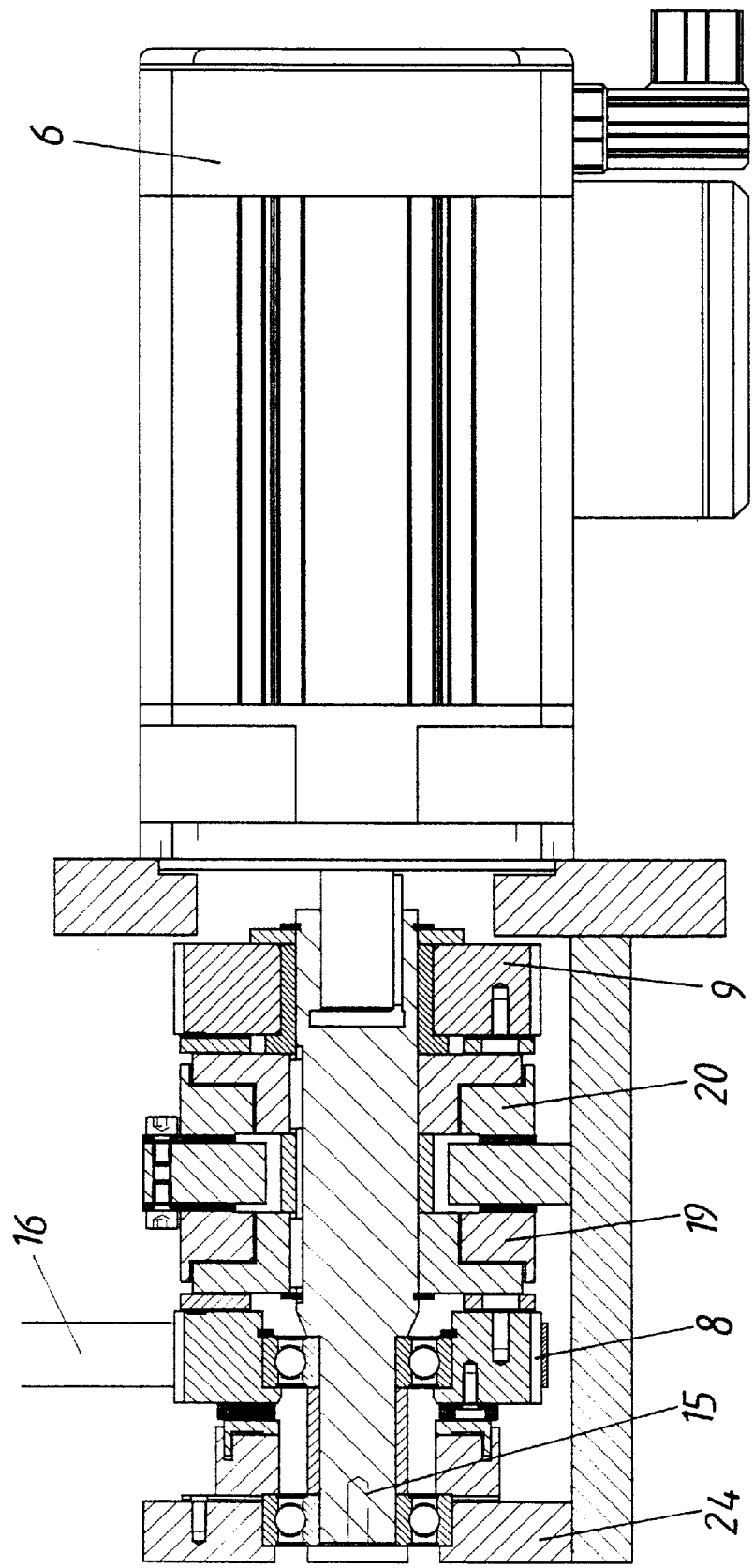

The embodiment shown in FIGS. 1, 4 and 5 has two electromagnetic couplings 19, 20 which couple either the drive wheel 8 or the drive wheel 9 to the drive output shaft 15 of the electric motor 6. In normal operation of the injection molding machine the drive wheel 9 is coupled by way of the electromagnetic coupling 20 to the drive output shaft 15 of the electric motor 6. After each injection cycle the electric motor 6 rotates the nut 13 by way of the drive wheel 9 and the belt 14 whereby the spindle 12 and therewith the ejector plate 10 is linearly reciprocated and the injection moldings are ejected from the movable mold mounting plate 1.

After a mold change when an injection molding mold of a different height from the preceding one is used, the drive wheel 9 is uncoupled from the drive output shaft 15 and the drive wheel 8 is coupled to the drive output shaft 15 by means of the electromagnetic coupling 19. The adjusting nuts 18 which are fixedly connected to the belt wheels 21 can then be rotated by means of the electric motor 6. The movable mold mounting plate 1 is linearly displaced by means to the adjusting spindle 17, by virtue of the rotation of the adjusting nuts 18.

The adjusting spindles 17 are provided with eyes 32 to which the bell crank mechanism is pivotably connected.

Figure 6:
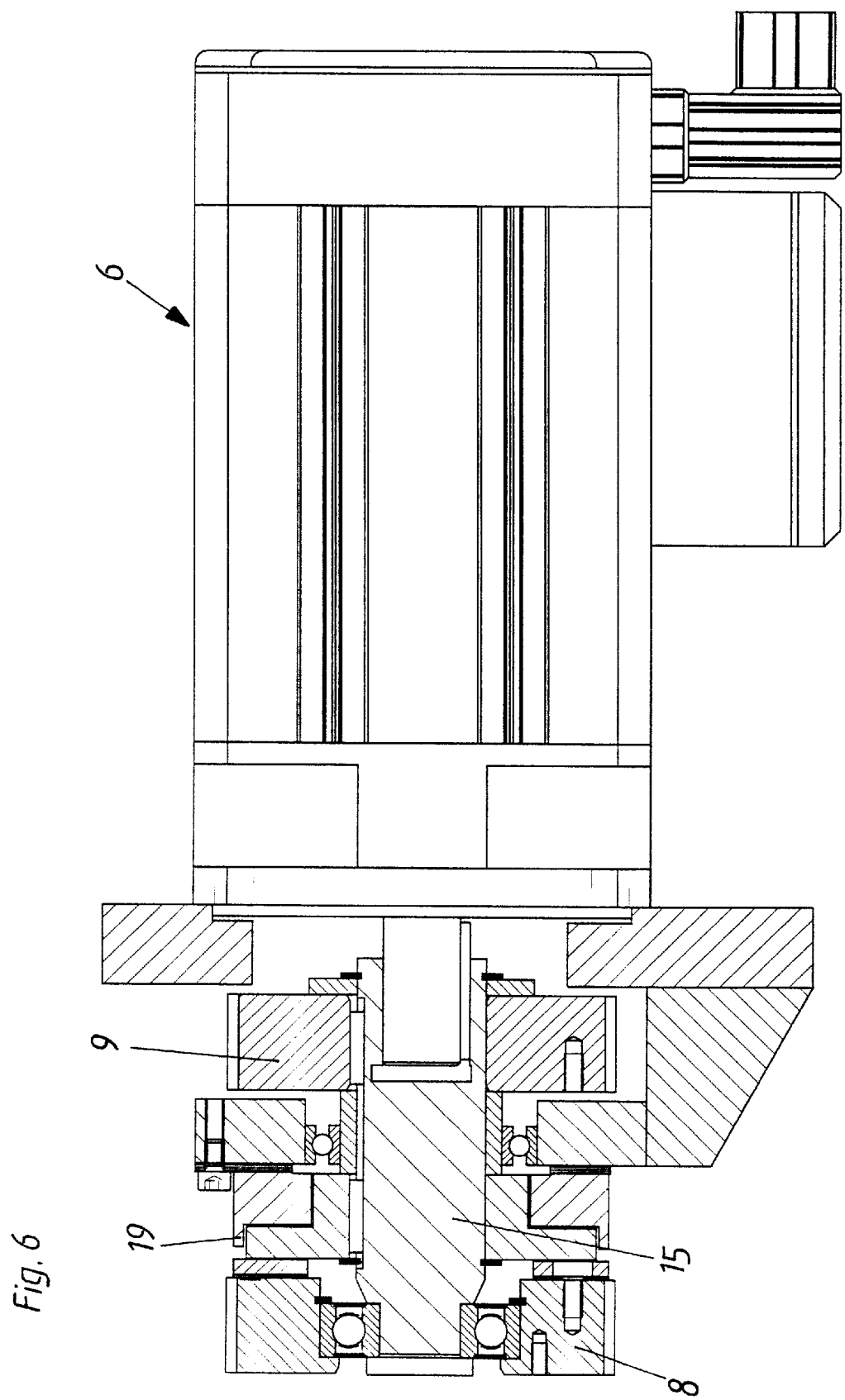

In the embodiment shown in FIG. 6 the drive wheel 9 for the drive of the ejector plate 10 is continuously connected to the drive output shaft 15 of the electric motor 6. The drive wheel 8 for mold height adjustment can be selectively coupled to the drive output shaft 15 by means of an electromagnetic coupling 19.

The mode of operation of the ejection unit is the same as the embodiment just described above. During mold height adjustment when the drive wheel 8 is coupled to the drive output shaft 15 however the ejector plate 10 is displaced at the same time as the spindle 12 is axially displaced by way of the drive wheel 9 which is continuously coupled to the drive output shaft 15. In this embodiment therefore after mold height adjustment has been effected, after the drive wheel 8 has been uncoupled again, it is necessary for the ejector plate 10 to be moved into the desired starting position again by rotation of the electric motor 6 and the drive output shaft 15.

Figure 7:
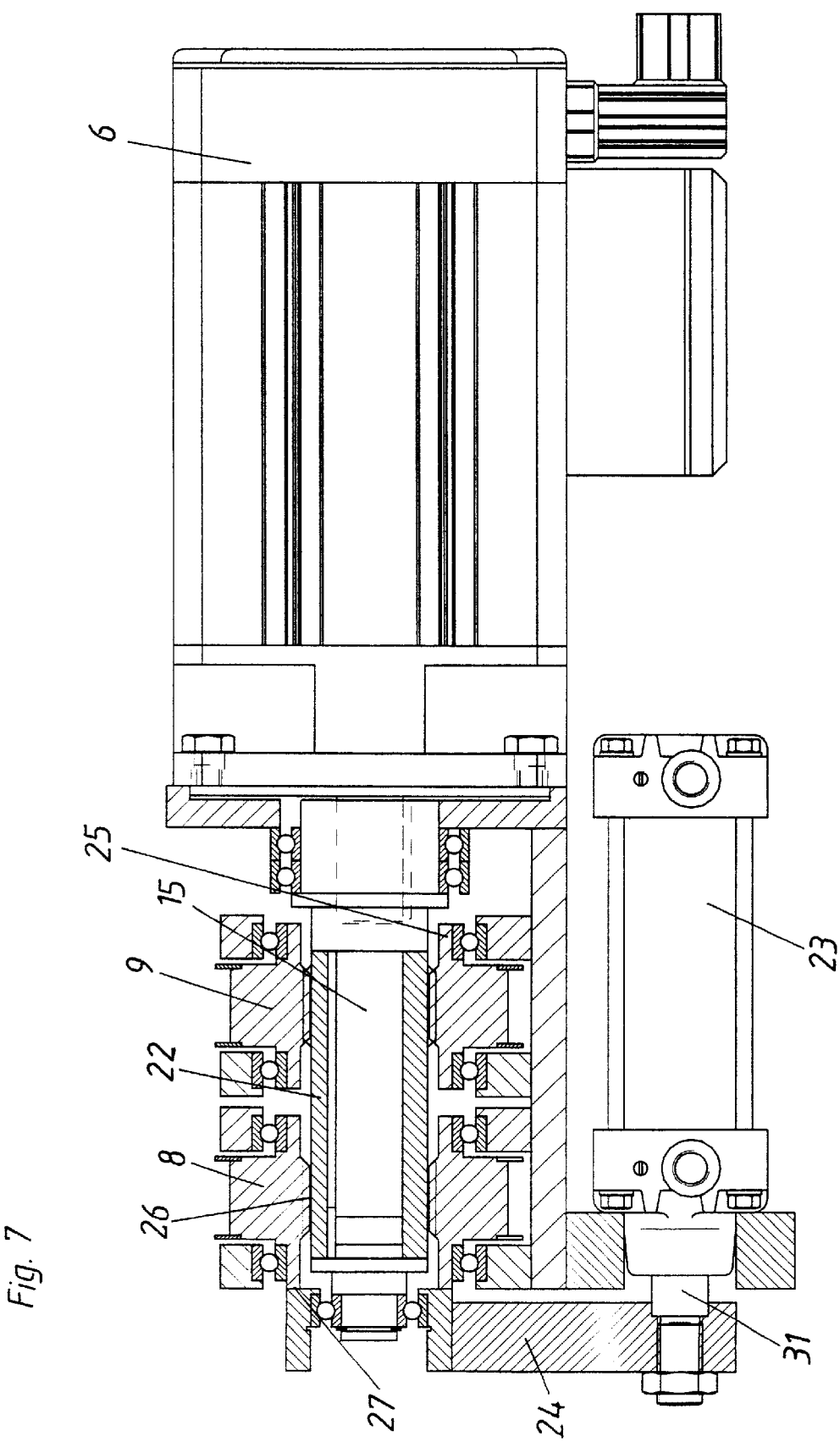
Figure 8:
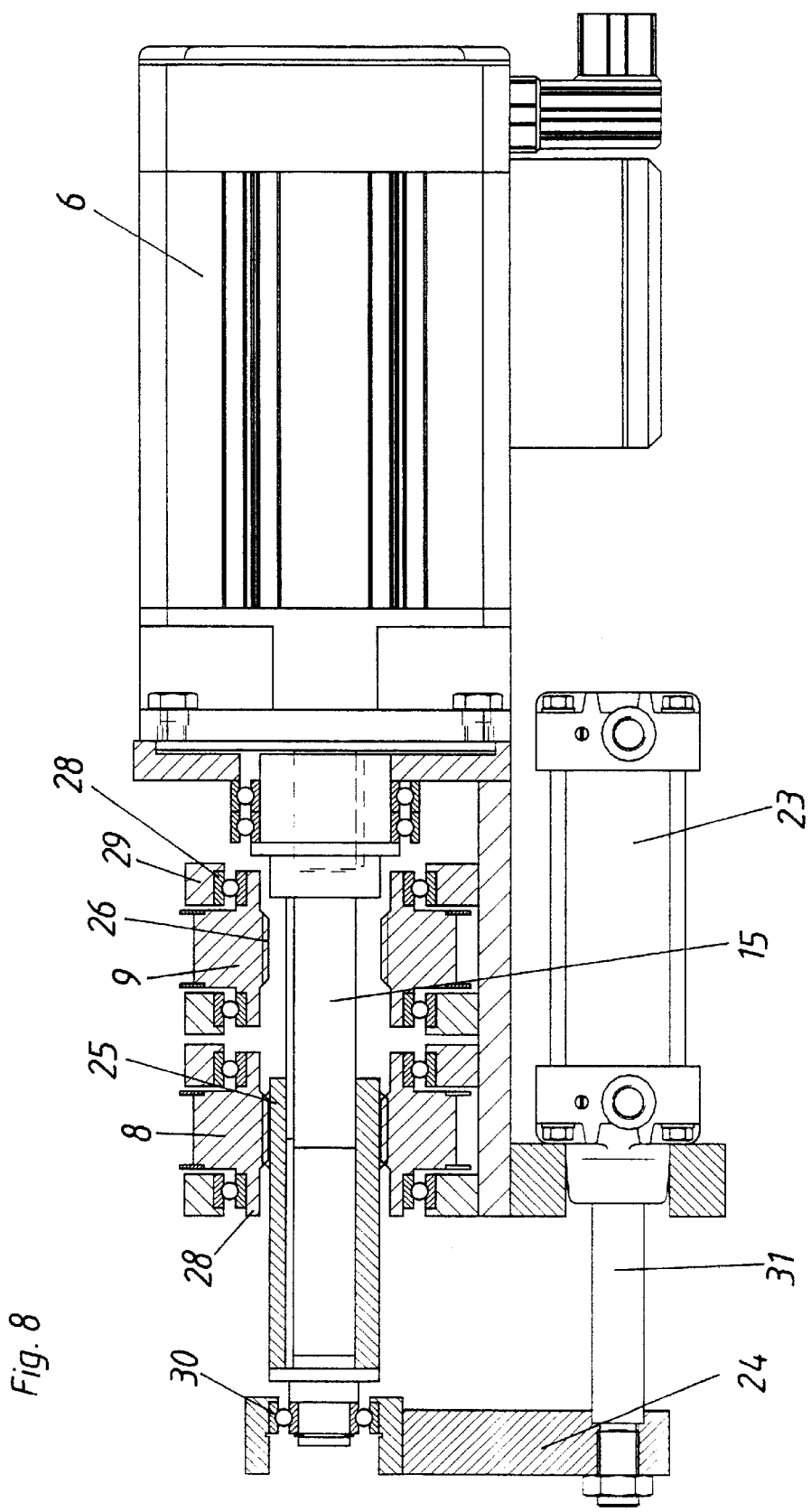

In the embodiment shown in FIGS. 7 and 8 coupling of the drive wheels 8, 9 is effected by way of a coupling tube 22 which is axially displaced by a pneumatic coupling cylinder 23. The coupling tube 22 is supported in a bracket 24 which is screwed to a cylinder rod 31 of the pneumatic coupling cylinder 23.

The coupling tube 22 surrounds the drive output shaft 15 and is non-rotatably connected thereto for example by a spline-key connection.

At its outer peripheral surface the coupling tube 22 is provided with a gear ring 25. Each of the drive wheels 8, 9 is provided with an internal gear ring 26. When the coupling tube 22 is in the position shown in FIG. 7 the drive wheel 9 is driven by the electric motor 6 for the drive of the ejection unit. In that case, the bracket 24 presses in face contact against a friction surface 27 of the drive wheel 8 so that the latter is held absolutely still. The drive output shaft 15 is mounted in the bracket 24 by way of a bearing 30.

If the mold height is to be adjusted then the coupling tube 22 is moved by the coupling cylinder 23 into the position shown in FIG. 8 and the gear ring 25 of the coupling tube 22 is brought into engagement with the gear ring 26 of the drive wheel 8. The mold height can now be adjusted by rotation of the drive output shaft 15.

What is claimed is:

1. An ejection unit for an injection molding machine comprising: a movable and a stationary mold mounting plate; a carrier plate anchored to one of the mold mounting plates, an electric motor mounted to the carrier plate, the motor having a drive output shaft for displacing an elector plate, and a drive wheel for mold height adjustment, coupled to the drive output shaft.

2. An ejection unit as set forth in claim 1 wherein the drive wheel is a belt pulley.

3. An ejection unit as set forth in claim 1 wherein the drive wheel is a gear wheel.

4. An ejection unit as set forth in claim 1 wherein two drive wheels are mounted on the drive output shaft, one thereof moving the ejector plate and one being provided for the drive of the mold height adjustment.

5. An ejection unit as set forth in claim 4 wherein the drive wheel for the ejection plate is permanently non-rotatably coupled to the drive output shaft while the drive wheel for the mold height adjustment is selectively coupleable to the drive output shaft.

6. An ejection unit as set forth in claim 4 wherein the two drive wheels are alternately coupleable to the drive output shaft.

7. An ejection unit as set forth in claim 5 wherein coupling of the drive wheels to the drive output shaft is effected by at least one electromagnetic coupling.

8. An ejection unit as set forth in claim 5 wherein the drive wheels are pneumatically or hydraulically coupleable to the drive output shaft.

9. An ejection unit as set forth in claim 8 wherein the drive output shaft projects into an axially displaceable coupling tube which has an outer gear ring and which is coupled to the drive output shaft by a splinekey connection, the two drive wheels each having an internal gear ring and the outer gear ring of the coupling tube being brought alternately into engagement with the gear ring of each drive wheel by axial displacement of the coupling tube.

10. An ejection unit as set forth in claim 9 wherein the coupling tube is axially displaceable by a bracket which bears in face contact and in frictional engagement against one of the drive wheels for the mold height adjustment when the gear ring of the coupling tube is in engagement with the other drive wheel for the ejector plate.

11. An ejection unit as set forth in claim 1 wherein said carrier plate is anchored to the movable mold mounting plate.

* * * * *